United States Patent [19]

Kanesaka et al.

[11] Patent Number: 5,427,989
[45] Date of Patent: Jun. 27, 1995

[54] CATALYSTS FOR THE PURIFICATION OF EXHAUST GAS

[75] Inventors: Hiroyuki Kanesaka, Yokohama; Naoki Kachi, Yokosuka, both of Japan

[73] Assignee: Nissan Motor Co., Ltd., Yokohama, Japan

[21] Appl. No.: 200,144

[22] Filed: Feb. 23, 1994

[30] Foreign Application Priority Data

Mar. 11, 1993 [JP] Japan .................................. 5-050868

[51] Int. Cl.$^6$ ........................................... B01J 29/068
[52] U.S. Cl. ................................... 502/66; 423/213.5; 423/239.2; 502/74
[58] Field of Search ................. 502/74, 66; 423/213.5, 423/239.2

[56] References Cited

U.S. PATENT DOCUMENTS 3,476,508  11/1969  Kearby .............................. 423/213.5

FOREIGN PATENT DOCUMENTS

| | | | |
|---|---|---|---|
| 3049234 | 3/1988 | Japan | 423/239.2 |
| 1-127044 | 5/1989 | Japan . | |
| 1135542 | 5/1989 | Japan | 423/239.2 |
| 3056139 | 3/1991 | Japan | 423/239.2 |
| 4018915 | 1/1992 | Japan | 423/239.2 |
| 5068888 | 3/1993 | Japan | 423/239.2 |

*Primary Examiner*—Asok Pal
*Attorney, Agent, or Firm*—Foley & Lardner

[57] ABSTRACT

A catalyst for the purification of exhaust gas comprises a first coating layer of activated alumina containing at least one of Pt, Pd and Rh, a second coating layer of activated alumina containing no noble metal and a third coating layer of zeolite ion-exchanged with Cu or Co and develops excellent purification performance in lean-burn atmosphere after engine aging treatment.

17 Claims, No Drawings

CATALYSTS FOR THE PURIFICATION OF EXHAUST GAS

BACKGROUND OF THE INVENTION

1. Field of the Invention

This invention relates to a catalyst for purifying an exhaust gas discharged from an internal engine for automobiles or the like.

2. Description of the Related Art

There have hitherto been used catalysts for the purification of exhaust gas using zeolite as disclosed in JP-A-1-127044. This catalyst for the purification of exhaust gas has a structure that a first catalyst layer inclusive of a noble metal ingredient generating oxidation reaction is coated onto a monolith carrier and then a second catalyst layer obtained by ion-exchanging zeolite with Cu is formed on the first catalyst layer. When such a catalyst is used in the purification of the exhaust gas, hydrocarbon (HC), carbon monoxide (CO) and nitrogen oxides (NOx) are efficiently purified even in an exhaust gas atmosphere having an oxygen concentration higher than theoretical value (lean-burn atmosphere) to improve the catalytic purification performance.

In the catalyst having the above structure, however, the performances after an engine aging treatment are considerably degraded as compared with those of a catalyst having no oxidation catalytic layer as an inner layer and can not provide satisfactory purification activity.

SUMMARY OF THE INVENTION

It is, therefore, an object of the invention to provide a novel catalyst for the purification of exhaust gas developing a satisfactory purification performance in lean-burn atmosphere after an engine aging treatment.

According to the invention, there is the provision of a catalyst for the purification of exhaust gas comprising a honeycomb monolith carrier, a first coating layer formed on the carrier and composed mainly of activated alumina containing at least one noble metal selected from platinum, palladium and rhodium, a second coating layer formed on the first coating layer and composed mainly of activated alumina containing no noble metal, and a third coating layer formed on the second coating layer and composed mainly of zeolite powder ion-exchanged with a metal such as Cu or Co.

DESCRIPTION OF THE PREFERRED EMBODIMENTS

In the exhaust gas purification catalyst according to the invention, the first coating layer is composed mainly of activated alumina containing at least one noble metal selected from platinum, palladium and rhodium and induces an oxidation catalytic reaction in the lean-burn atmosphere to purify HC and CO. The second coating layer is composed mainly of activated alumina containing no noble metal ,and has not only a function of insulating heat of oxidation reaction induced in the first coating layer to prevent the temperature rising of the third coating layer during the engine aging treatment and hence control the deterioration of durability but also a function of controlling the deterioration of the purification performance due to the movement of Cu or Co as an active ingredient in the third ingredient from active site of zeolite to the first coating layer through the engine aging treatment. The third coating layer is composed mainly of zeolite powder ion-exchanged with Cu or Co and has a conversion performance of NOx in the lean-burn atmosphere of gas discharged from the engine containing a great amount of oxygen.

As the zeolite powder in the third coating layer, use may be made of ZSM-5 zeolite, mordenite, ferrierite and the like. In the second coating layer, the activated alumina can be carried with a metal other than the above noble metal, i.e. rare earth metals such as cerium, lanthanum and the like and zirconium, barium, calcium and potassium. In the latter case, the amount of the metal carried is within a range of 1–15% by weight.

The following examples are given in illustration of the invention and are not intended as limitations thereof.

EXAMPLE 1

A solution of dinitrodiammineplatinum is added to activated alumina powder composed mainly of γ-alumina so as to have a platinum content of 2.0% by weight per 1000 g of the powder with stirring, dried in an oven at 150° C. for 3 hours and fired in air at 400° C. for 2 hours. In a ball mill ]pot are charged 1500 g of the platinum-carried activated alumina, 800 g of activated alumina composed mainly of γ-alumina, 460 g of 10% by weight $HNO_3$ (nitric acid) and 1840 g of water, which are pulverized for 8 hours to obtain a slurry. The thus obtained slurry is applied onto a honeycomb monolith carrier (1.7 L, 400 cells), dried, and fired in air at 400° C. for 2 hours. In this case, the amount of the slurry applied is set to be 50 g/L after the firing.

Then, 2000 g of activated alumina composed mainly of γ-alumina, 400 g of 10% by weight of nitric acid and 1600 g of water are charged in a ball mill pot and pulverized for 8 hours to obtain a slurry. The thus obtained slurry is applied in an amount of 25 g/L after the firing, dried and fired in air at 400° C. for 2 hours.

Furthermore, 5.2 kg of 0.2 mol/1 of copper nitrate or copper acetate is mixed with 2 kg of zeolite powder with stirring and filtered. After the mixing and filtering are repeated 3 times, the mixture is dried and fired to prepare zeolite powder ion-exchanged with Cu. In a porcelain ball mill are charged 1890 g of the zeolite powder ion-exchanged with Cu, 11.50 g of silica sol (solid content: 20%) and 1100 g of water, which are pulverized to obtain a slurry. The thus obtained slurry is applied in an amount of 200 g/L after the firing, dried and fired in air at 400° C. for 2 hours to obtain a catalyst No. 1.

EXAMPLE 2

A catalyst No. 2 is obtained by the same method as in Example 1 except that Co is used instead of Cu as an ion-exchanging metal.

EXAMPLE 3

A catalyst No. 3 is obtained by the same method as in Example 1 except that palladium is used instead of platinum.

EXAMPLE 4

A catalyst No. 4 is obtained by the same method as in Example 1 except that platinum and rhodium are used instead of platinum as follows.

A solution of dinitrodiammineplatinum is added to activated alumina powder composed mainly of γ-alumina so as to have a platinum content of 1.63% by weight per 1000 g of the powder with stirring, dried and fired in same manner as in Example 1. Furthermore, a solution of rhodium nitrate is added to the same activated alumina powder as mentioned above so as to have a rhodium content of 1% by weight per 1000 g of the powder with stirring, dried and fired in same manner as in Example 1. In a ball mill pot are charged 1400 g of the platinum-carried activated alumina, 434 g of the rhodium-carried activated alumina, 936 g of cerium oxide and 2221 g of acidic boehmite sol (sol obtained by adding 10% by weight of nitric acid to a suspension of 10% by weight of boehmite alumina), which are pulverized for 8 hours to obtain a slurry. The thus obtained slurry is applied onto a honeycomb monolith carrier (1.7 L, 400 cells), dried, and fired in air at 400° C. for 2 hours. In this case, the amount of the slurry applied is set to be 50 g/L after the firing.

EXAMPLE 5

The same platinum-carried activated alumina as in Example 1 is coated onto the same honeycomb monolith carrier as in Example 1.

Then, 2000 g of cerium-carried activated alumina powder containing 3% by weight of Ce, 400 g of 10% by weight of nitric acid and 1600 g of water are charged in a ball mill pot and pulverized for 8 hours to obtain a slurry. The thus obtained slurry is applied in an amount of 25 g/L after the firing, dried and fired in air at 400° C. for 2 hours.

Furthermore, the same zeolite ion-exchanged with Cu as in example 1 is applied to obtain a catalyst No. 5.

EXAMPLE 6

The same platinum-carried activated alumina as in Example 1 is coated onto the same honeycomb monolith carrier as in Example 1.

Then, 2000 g of cerium and lanthanum-carried activated alumina powder containing 3% by weight of Ce and 3% by weight of La, 400 g of 10% by weight of nitric acid and 1600 g of water are charged in a ball mill pot and pulverized for 8 hours to obtain a slurry. The thus obtained slurry is applied in an amount of 25 g/L after the firing, dried and fired in air at 400° C. for 2 hours.

Furthermore, the same zeolite ion-exchanged with Cu as in example 1 is applied to obtain a catalyst No. 6.

EXAMPLE 7

A catalyst No. 7 is obtained in the same manner as in Example 3 except that palladium and rhodium are used instead of platinum in Example 1 as follows.

A solution of palladium nitrate is added to activated alumina powder composed mainly of γ-alumina so as to have a palladium content of 2.00% by weight per 1000 g of the powder with stirring, dried in an oven at 150° C. for 3 hours and fired in air at 400° C. for 2 hours to prepare a palladium-carried activated alumina. Then, a solution of rhodium nitrate is added to activated alumina powder composed mainly of γ-alumina so as to have a rhodium content of 1.0% by weight per 1000 g of the powder with stirring, dried and fired in the same manner as described above to prepare a rhodium-carried activated alumina. Thereafter, 1400 g of the palladium-carried activated alumina, 434 g of the rhodium-carried activated alumina, 936 g of cerium oxide and 2221 g of acidic boehmite sol (sol obtained by adding 10% by weight of nitric acid to a suspension of 10% by weight of boehmite alumina) are charged in a ball mill pot and pulverized for 8 hours to obtain a slurry. The thus obtained slurry is applied onto a honeycomb monolith carrier (1.7 L, 400 cells), dried, and fired in air at 400° C. for 2 hours. In this case, the amount of the slurry applied is set to be 50 g/L after the firing.

COMPARATIVE EXAMPLE 1

A catalyst No. 101 is prepared in the same manner as in Example 1 except that zeolite is used instead of the zeolite ion-exchanged with Cu in Example 1.

COMPARATIVE EXAMPLE 2

A catalyst No. 102 is prepared in the same manner as in Comparative Example 1 except that the second coating layer of activated alumina is omitted.

COMPARATIVE EXAMPLE 3

A catalyst No. 103 is prepared in the same manner as in Example 4 except that the second coating layer of activated alumina is omitted.

Test Example

Each of the catalysts in Examples 1–7 and Comparative Examples 1–3 is cut into a specimen having a size of 120 cc, which is placed in a convertor for test and aged by a gas discharged from an engine under the following conditions. Then, the catalytic activity is evaluated with respect to the above aged specimen under the following evaluation conditions to obtain results as shown in Table 1.

| Aging conditions | |
| --- | --- |
| Engine displacement | 2000 cc |
| Aging temperature | 550° C. |
| Aging time | 50 hours |
| Composition of emission gas at inlet | CO: 0.4–0.6% |
| | $O_2$: 0.5 ± 0.1% |
| | NOx: 1500 ppm |
| | HC: 1000 ppm |
| | $CO_2$: 14.9% ± 0.1% |
| Evaluation conditions | |
| Catalyst volume | 0.12 L |
| Apparatus | apparatus for evaluation of exhaust model gas (use of a bomb as gas) |
| Inlet temperature of catalyst | 300° C. |
| Space velocity | about 20000 $h^{-1}$ |
| A/F = model gas corresponding to 18.0 | |
| HC = 2500 ppm (converted to C1) | |
| NOx = 500 PPM | |
| CO = 2000 ppm | |
| $CO_2$ = 14.0% | |
| $O_2$ = 4.5% | |
| $H_2O$ = 10% | |
| $N_2$ = balance | |

TABLE 1

| | Purification ratio at 400° C. (%) | | |
| --- | --- | --- | --- |
| Catalyst No. | HC | CO | $NO_x$ |
| No. 1 | 81 | 72 | 35 |
| No. 2 | 83 | 75 | 33 |
| No. 3 | 79 | 71 | 37 |
| No. 4 | 81 | 75 | 36 |
| No. 5 | 84 | 74 | 37 |
| No. 6 | 80 | 73 | 37 |
| No. 7 | 79 | 74 | 36 |
| No. 101 | 35 | 21 | 23 |
| No. 102 | 64 | 78 | 18 |
| No. 103 | 61 | 75 | 17 |

As mentioned above, the exhaust gas purification catalyst according to the invention comprises a first coating layer of activated alumina containing at least one noble metal of Pt, Pd and Rh, a second coating layer of activated alumina containing no noble metal and a third coating layer of zeolite powder ion-exchanged with Cu or Co and has an effect of developing a satisfactory purification performance in the lean-burn atmosphere after the engine aging treatment.

What is claimed is:

1. A catalyst for the purification of exhaust gas comprising a honeycomb monolith carrier, a first coating layer formed on the carrier and composed mainly of activated alumina containing at least one noble metal selected from platinum, palladium and rhodium, a second coating layer formed on the first coating layer and composed mainly of activated alumina containing no noble metal, and a third coating layer formed on the second coating layer and composed mainly of zeolite powder ion-exchanged with a metal.

2. A catalyst according to claim 1, wherein said metal for ion exchange is Cu or Co.

3. A catalyst according to claim 1, wherein said second coating layer contains 1–15% by weight of at least one metal selected from rare earth metals, zirconium, barium, calcium and potassium.

4. A catalyst according to claim 1, wherein said zeolite is selected from ZSM-5 zeolite, mordenite and ferrierite.

5. A catalyst according to claim 1, wherein said noble metal in said first layer is platinum.

6. A catalyst according to claim 1, wherein said noble metal in said first layer is palladium.

7. A catalyst according to claim 1, wherein said noble metal in said first layer is rhodium.

8. A catalyst according to claim 2, wherein said metal for ion exchange is Cu.

9. A catalyst according to claim 2, wherein said metal for ion exchange is Co.

10. A catalyst according to claim 3, wherein said metal is a rare earth metal.

11. A catalyst according to claim 3, wherein said metal is zirconium.

12. A catalyst according to claim 3, wherein said metal is barium.

13. A catalyst according to claim 3, wherein said metal is calcium.

14. A catalyst according to claim 3, wherein said metal is potassium.

15. A catalyst according to claim 4, wherein said zeolite is ZSM-5 zeolite.

16. A catalyst according to claim 4, wherein said zeolite is mordenite.

17. A catalyst according to claim 4, wherein said zeolite is ferrierite.

* * * * *